US012233908B2

(12) United States Patent
Margosian et al.

(10) Patent No.: US 12,233,908 B2
(45) Date of Patent: Feb. 25, 2025

(54) ASYMMETRICAL AUTONOMOUS VEHICLE COMPUTING ARCHITECTURE

(71) Applicant: ARGO AI, LLC, Pittsburgh, PA (US)

(72) Inventors: Brian T. Margosian, Lathrup Village, MI (US); Michel H. J. Laverne, Pittsburgh, PA (US); Ryan J. Skaff, Farmington Hills, MI (US); Shadi A. Jammoul, Pittsburgh, PA (US)

(73) Assignee: VOLKSWAGEN GROUP OF AMERICA INVESTMENTS, LLC, Reston, VA (US)

( * ) Notice: Subject to any disclaimer, the term of this patent is extended or adjusted under 35 U.S.C. 154(b) by 235 days.

(21) Appl. No.: 17/967,272

(22) Filed: Oct. 17, 2022

(65) Prior Publication Data

US 2024/0124026 A1    Apr. 18, 2024

(51) Int. Cl.
*B60W 60/00*    (2020.01)
*B60W 50/023*    (2012.01)

(52) U.S. Cl.
CPC .... *B60W 60/0018* (2020.02); *B60W 60/0016* (2020.02); *B60W 2420/403* (2013.01); *B60W 2420/408* (2024.01)

(58) Field of Classification Search
CPC ......... B60W 50/023; B60W 30/18163; B60W 50/12; H04N 13/239; B60R 25/245; G06F 11/2038; B62D 5/0493; B62D 7/159; G05D 1/0242; B60L 3/00; G08G 1/16
See application file for complete search history.

(56) References Cited

U.S. PATENT DOCUMENTS

| 5,054,568 A * | 10/1991 | Shiraishi ............... B62D 7/159 |
| | | 701/43 |
| 10,778,960 B2 * | 9/2020 | Grenier ............... H04N 13/239 |
| 10,926,738 B1 * | 2/2021 | Tucci ................... B60R 25/245 |
| 11,030,031 B2 | 6/2021 | Hayes et al. |
| 2016/0306720 A1 * | 10/2016 | Fuhrman ............ G06F 11/2038 |
| 2018/0348754 A1 | 12/2018 | Samii et al. |
| 2019/0100237 A1 * | 4/2019 | Klesing ............... B62D 5/0493 |
| 2019/0250611 A1 * | 8/2019 | Costin ................. G05D 1/0242 |

(Continued)

FOREIGN PATENT DOCUMENTS

| CN | 106846901 B * | 7/2019 | .............. G08G 1/16 |
| CN | 112849055 | 5/2021 | |

(Continued)

OTHER PUBLICATIONS

Tang, Q. et al., "ATMA System Description", Colorado Department of Transportation—Research, Denver, CO, Aug. 2021, 39 pages.

(Continued)

*Primary Examiner* — Yuri Kan
(74) *Attorney, Agent, or Firm* — Sterne, Kessler, Goldstein & Fox P.L.L.C.

(57) ABSTRACT

Disclosed herein are system, method, and computer program product embodiments for an asymmetrical Autonomous Vehicle Systems (AVS). A backup AVS is implemented on a vehicle to serve as a failover system for one or more of the primary AVS components or processes (e.g., steering, braking, etc.). In this way, during primary AVS failures, the backup AVS can dynamically handle a subset of vehicle operations in various component configuration levels based on a desired mission level.

20 Claims, 13 Drawing Sheets

(56) References Cited

U.S. PATENT DOCUMENTS

| | | |
|---|---|---|
| 2020/0021961 A1 | 1/2020 | Li et al. |
| 2021/0046952 A1 | 2/2021 | Ju et al. |
| 2021/0094589 A1 | 4/2021 | Sarett et al. |
| 2021/0171062 A1 | 6/2021 | Hecker et al. |
| 2021/0300425 A1 | 9/2021 | Hyde et al. |
| 2023/0391368 A1* | 12/2023 | Park ................ B60W 30/18163 |

FOREIGN PATENT DOCUMENTS

| | | | | |
|---|---|---|---|---|
| CN | 113002309 A | * | 6/2021 | ................ B60L 3/00 |
| DE | 102019124979 A1 | * | 3/2021 | ............ B60W 50/12 |
| KR | 10-2021-0073705 | | 6/2021 | |

OTHER PUBLICATIONS

Shrestha, B., "Methods to Ensure Software Safety for Safety-Critical Autonomous Systems: A Systematic Literature Review", Abo Akademi University, Dec. 2021, 52 pages.

International Search Report and Written Opinion of the International Searching Authority directed to related International Patent Application No. PCT/US2023/026543, mailed Oct. 24, 2023; 12 pages.

* cited by examiner

ASYMMETRICAL AUTONOMOUS VEHICLE COMPUTING ARCHITECTURE

BACKGROUND

When an autonomous vehicle has a failure, control of the vehicle may be compromised, depending on the seriousness of the failure. Some current autonomous vehicle systems (AVS) may have a secondary vehicle control system to take over for a failing primary system. However, redundant systems are expensive and may require significant computing and power resources. Thus, there is a need for a backup system that can manage select vehicle functions in the event of a primary system failure, that can be implemented with reduced costs and that can operate with minimal computing and power resources.

SUMMARY

The technology as disclosed herein provides, in multiple embodiments, a backup autonomous computing and sensor package that may be dynamically activated based on a multi-level response mission. The technology detects that a failure of one or more primary AVS components has occurred for a vehicle, determines a level of criticality of the failure, determines backup components to complete a vehicle mission at the level of criticality and dynamically activates AVS backup components necessary to complete the vehicle mission at the level of criticality. Data points received from one or more sensors may determine an input to the one or more vehicle controllers to complete the mission at the level of criticality.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
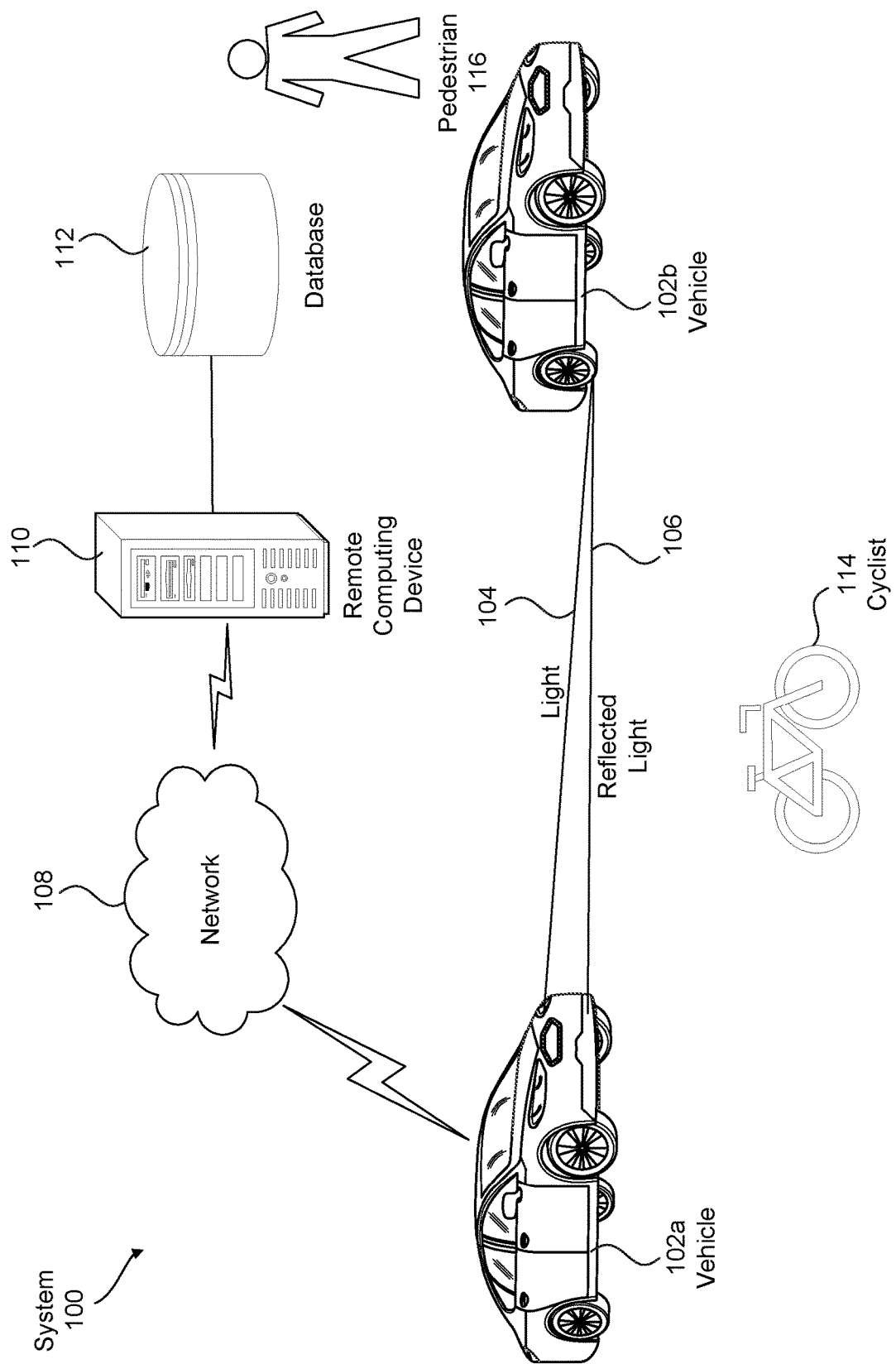
FIG. 1 illustrates an exemplary autonomous vehicle system, in accordance with aspects of the disclosure.

Provided herein are system, apparatus, device, method and/or computer program product embodiments, and/or combinations and sub-combinations thereof, for an asymmetrical Autonomous Vehicle System (AVS). A backup AVS is implemented on the vehicle to serve as a failover system for one or more of the primary AVS components or processes (e.g., sensors, steering, braking, etc.). In some embodiments, during primary AVS failures, the backup AVS may dynamically handle a subset of vehicle operations in various component configuration levels based on a desired vehicle mission and a level of criticality. For simple failures (e.g., single sensor failure), the vehicle mission may be to continue to navigate the vehicle as before the failure and to continuously monitor the failure. For example, sensor packages may include many sensors of the same kind (e.g., multiple cameras) as well as different types of sensors (e.g., cameras, lidar, radar, positional, etc.) to sense the surrounding environment of the vehicle. This type of redundancy may allow for continuous driving for minor AVS component failures. However, for critical AVS failures, the vehicle mission may be to stop or pull-over the vehicle as quickly as possible.

In some embodiments, the asymmetry of the AVS may be characterized by a different number of sensors supporting the primary AVS and the backup AVS. For example, the primary AVS may implement 8 lidar sensors of one type (short range lidar) and the backup AVS may implement 4 of the same sensor. In some embodiments, the asymmetry of the AVS may be characterized by different types of sensors supporting the primary AVS and the backup AVS. For example, the primary AVS implements cameras and a far field lidar, while the backup AVS implements a short range lidar. In some embodiments, the asymmetry of the AVS may be characterized by dynamic actuation of a subset of sensors available to the backup AVS. For example, the backup AVS actuates front facing lidar sensors, while not actuating rear facing lidar sensors. In some embodiments, the asymmetry of the AVS may be characterized by dynamic actuation of a subset of controllers available to the AVS or backup AVS. For example, backup braking and steering controllers may need to be immediately actuated for collision avoidance.

In non-limiting failure examples, for minor AVS failures (e.g., a single sensor failure), a similar sensor in the backup AVS may support the AVS and a vehicle mission will be to autonomously drive the vehicle for some period of time. However, for a total loss of connectivity between the AVS and the backup AVS, the backup AVS may implement a vehicle mission to continue driving the car until it can be stopped in desirable conditions. The vehicle mission therefore will dynamically drive a selection and activation of specific backup components needed to complete the mission. In some embodiments, to complete a mission, the backup AVS may use, at a minimum, electrical power, computing power, braking control components, steering control components, engine or motor control components, object detection components (e.g., lidar, radar, etc.) and navigation components (e.g., Global Positioning System (GPS) and mapping functionality).

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
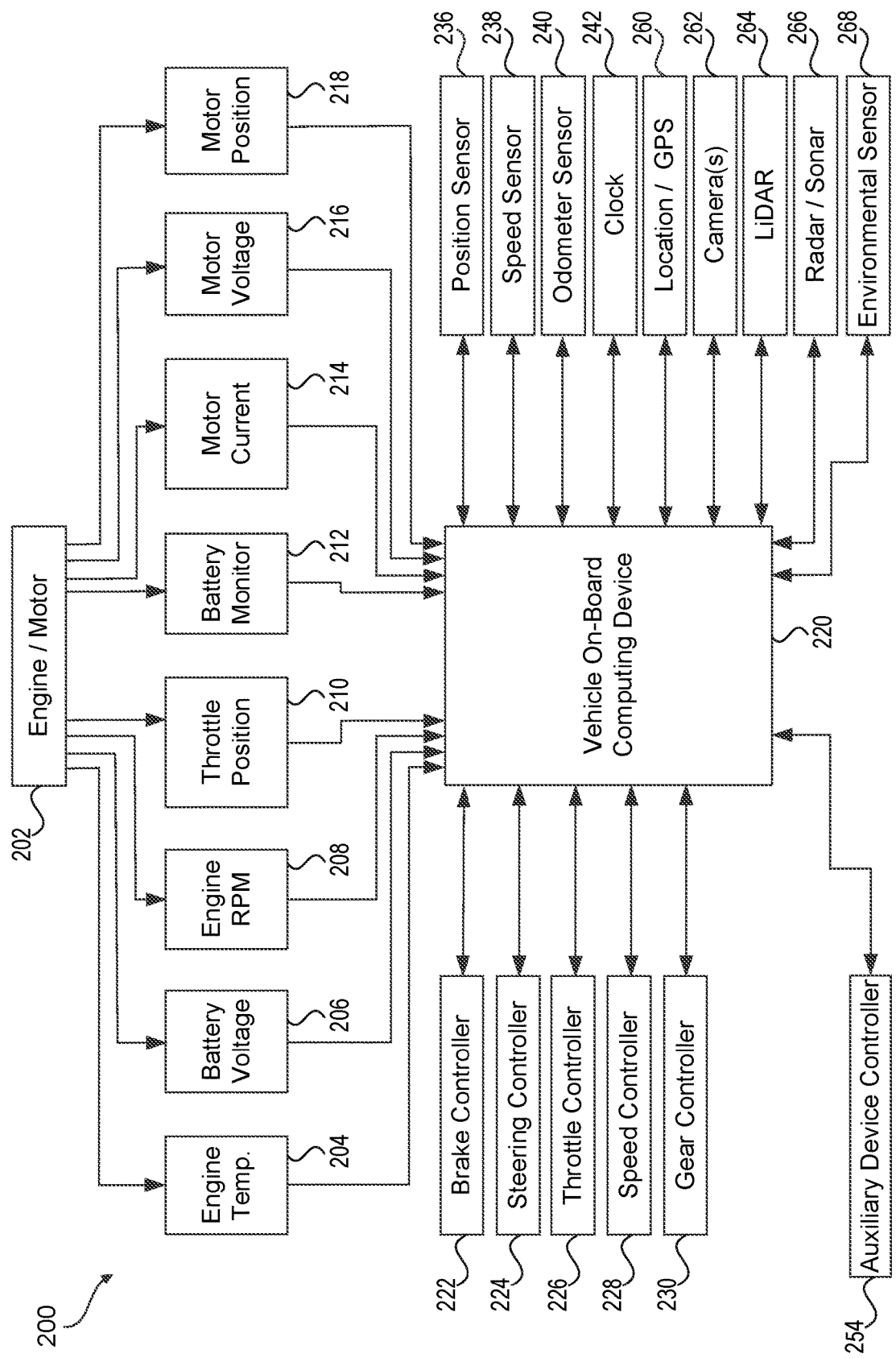
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a laser detection and ranging (lidar) system, a radio detection and ranging (RADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some embodiments, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 12. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the on-board computing device 220 may determine perception information of the surrounding environment of the AV 102a. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., lidar or RADAR data, camera images, etc.) in order to identify objects and/or features in the environment of AV 102a. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some embodiments, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects.

For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their future locations.

In some embodiments, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
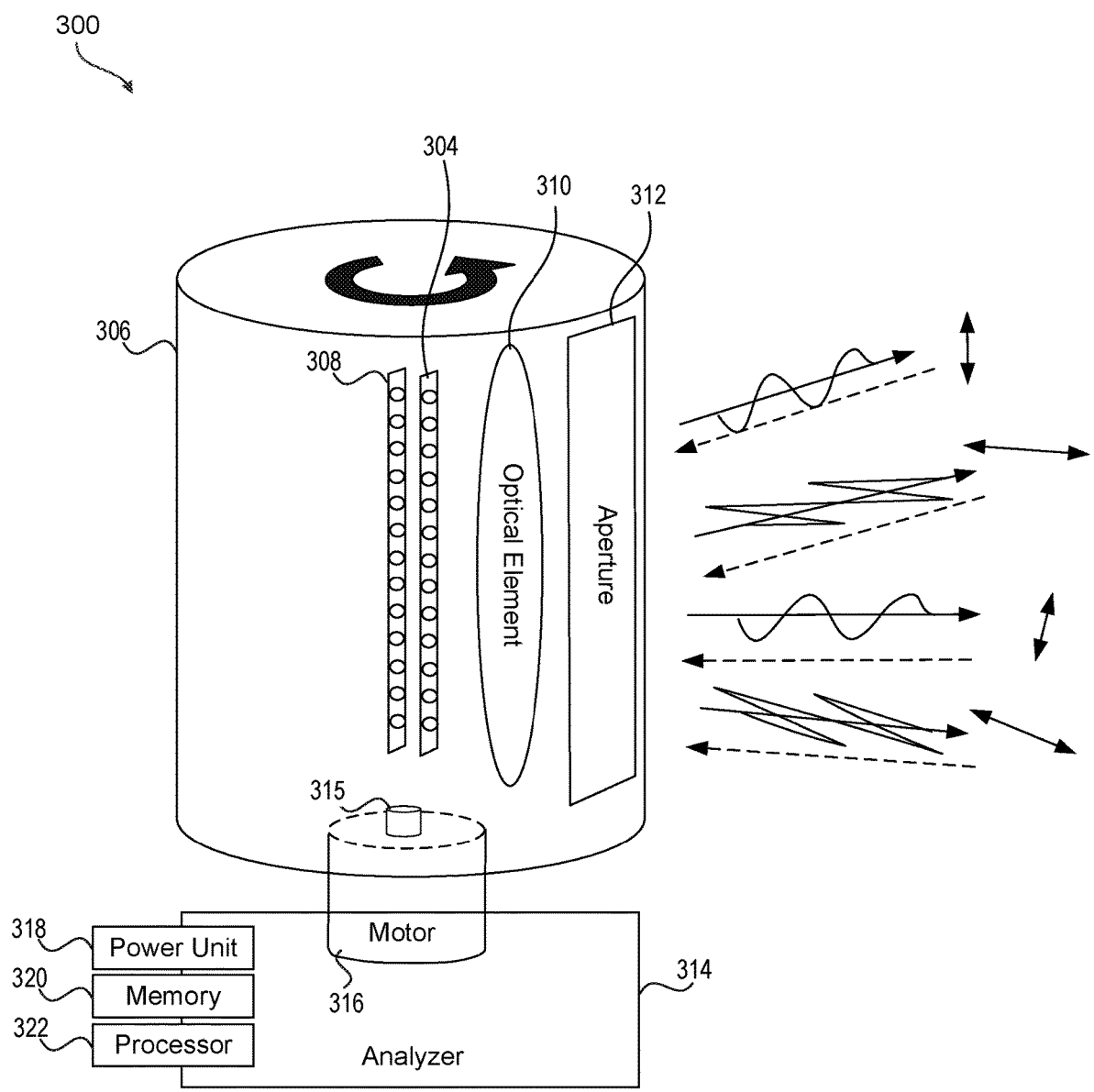
FIG. 3 illustrates an exemplary architecture for a Light Detection and Ranging ("lidar") system, in accordance with aspects of the disclosure.

FIG. 3 illustrates an exemplary architecture for a lidar system 300, in accordance with aspects of the disclosure. Lidar system 264 of FIG. 2 may be the same as or substantially similar to the lidar system 300. As such, the discussion of lidar system 300 is sufficient for understanding lidar system 264 of FIG. 2. It should be noted that the lidar system 300 of FIG. 3 is merely an example lidar system and that other lidar systems are further completed in accordance with aspects of the present disclosure, as should be understood by those of ordinary skill in the art.

As shown in FIG. 3, the lidar system 300 includes a housing 306 which may be rotatable 3600 about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The lidar system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or wave plates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or wave plates). Optionally, multiple optical element structures 310 may be arranged in an array on or integral with the shell portion of the housing 306.

Lidar system 300 includes a power unit 318 to power the light emitting system 304, a motor 316, and electronic components. Lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

Figure 4:
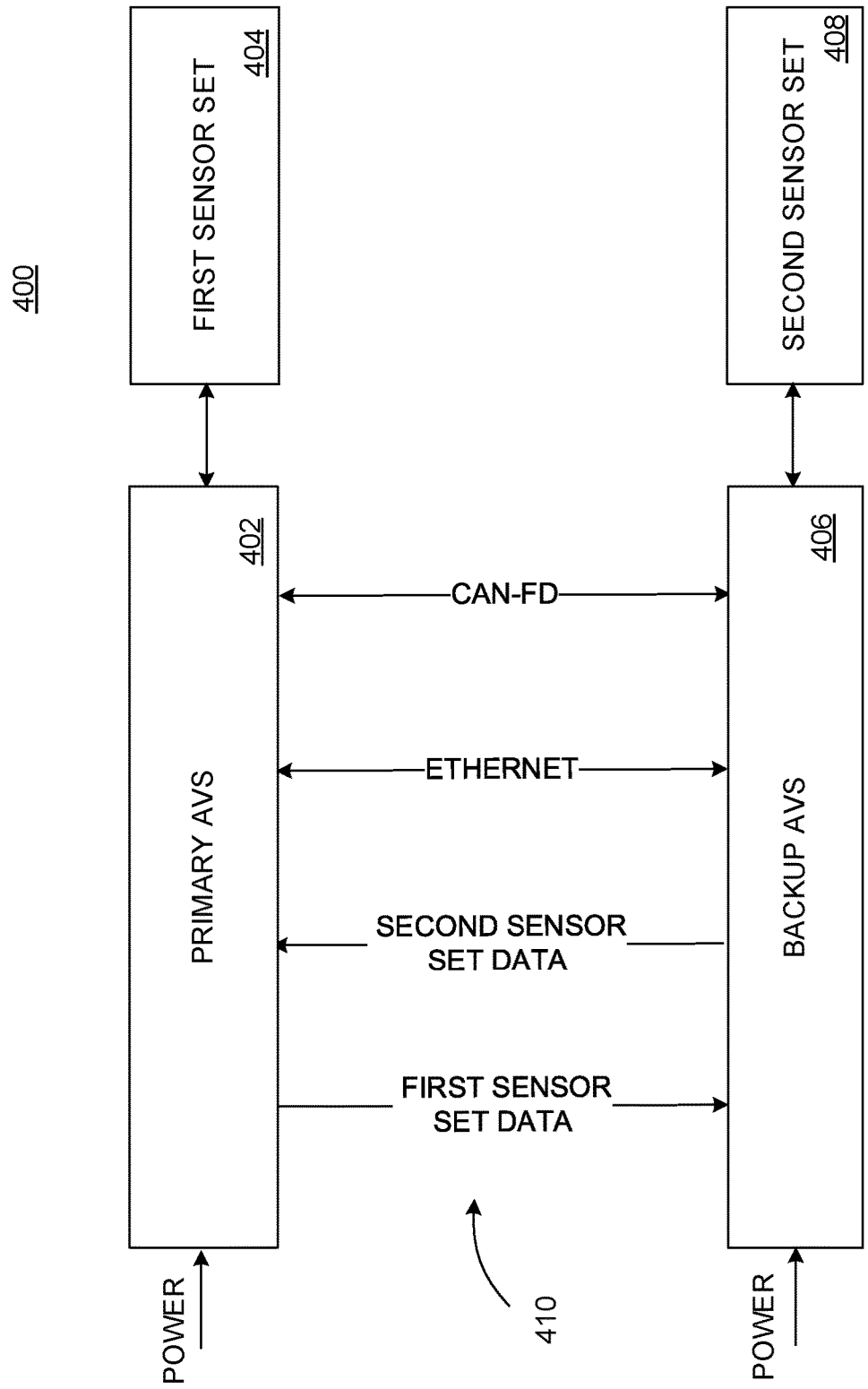
FIG. 4 illustrates an exemplary architecture for an AVS-backup AVS, in accordance with aspects of the disclosure.

FIG. 4 illustrates an exemplary architecture 400 for an AVS with a communicatively coupled backup AVS, in accordance with aspects of the disclosure. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

Some embodiments described herein implement an asymmetrical AVS computing architecture 400 including a first sensor set 404 connected to a primary AVS 402 and a second sensor set 408 connected to a backup AVS 406. In various embodiments, the architecture is asymmetrical as the primary AVS 402 and backup AVS 406 do not have a matching set of components as will be described in various example embodiments hereafter. In these various example embodiments, the backup AVS 406 may be dynamically configured to meet lower power requirements, reduced computing requirements, reduced object detection requirements, or reduced vehicle mission requirements and therefore may incur reduced capabilities relative to the AVS. For example, the primary AVS 402 system and the backup AVS 406 system may have asymmetrical computing capabilities to support disparate sets of sensors utilized by either system.

In various embodiments, the first and second sensor sets may implement a plurality of sensors, such as cameras. Cameras may include, but are not limited to, standard focal width cameras, wide angle cameras, telephoto cameras, stereo cameras, fisheye cameras, 360 degree cameras, or infrared cameras, to name a few. However, any known or future camera platform may be substituted without departing from the scope of the technology described herein.

These cameras may be placed in various positions, in various numbers and configurations proximate to an exterior vehicle surface or inside of the vehicle with visible sight lines. In one non-limiting example, cameras are placed on every side: front, rear, left and right, to stitch together a 360-degree view of their environment for obstacle detection, such as, other vehicles, pedestrians, roadways, obstructions located in or proximate to a vehicle travel path. In another non-limiting example, a single camera may generate a 360-degree view. In another non-limiting example, various cameras with different focal points and view angles collectively support an effort to identify the environment surrounding the vehicle, both near and far. Cameras may be useful for object detection by processing the visual data points in machine learning models. For example, machine learning models may be able to identify roadways, other vehicles, pedestrians, signs, intersections, etc. Cameras also may identify colors (e.g., roadway lines, signage, traffic signals, etc.).

In various embodiments, the first and second sensor sets may also implement one or more lidar systems, such as, but not limited to, near field lidar, far field lidar, short range lidar, mid-range lidar, long range lidar, etc. Lidar systems implement eye-safe laser beam technology to create a 3D representation of the surveyed environment by reflected light beams for object detection and navigation. Near field LiDAR generates a 3D near field layer at a range of approximately 10-20 meters to complement camera and radar detection, determining the full shape of objects and obstacles, especially in blind spots and at close range. In some embodiments, where near field lidar is used for low-speed maneuvering and cold-start use cases, the sensor may provide a wide field of view (e.g., 780×110°) and a sharp point cloud (e.g., for detecting sharp features on point-sampled geometry). Short range lidar generates a short field transmission at a range in the centimeter range to complement the near field lidar, cameras and radar detection, determining the shape of near objects and obstacles, especially in blind spots and at close range. Short-range lidar may be able to detect objects within a few centimeters and within a wide field of view. Long range lidar generates a far field transmission at a range of up to approximately 250 meters to complement the near field lidar, cameras and radar detection, providing early detection of close-to-midrange distant objects that may be at the edge of sight. Far field lidar generates a far field transmission at a range in kilometers to complement the near field and long rage lidar systems, camera and radar detection systems, and providing early detection of distant objects that are presently not in sight.

In various embodiments, the first and second sensor sets may also implement one or more radar systems. Radar may be useful for finding large objects, metal objects and relative speeds between the vehicle and objects detected. Radio detection and ranging (RADAR) technology in autonomous vehicles operates with millimeter waves and offers millimeter precision. The utilization of millimeter waves in autonomous vehicular radar ensures high resolution in obstacle detection and centimeter accuracy in position and movement determination. Radar systems send out radio waves that detect objects and gauge their distance and speed in relation to the vehicle in real time.

In various embodiments, the first and second sensor sets may also implement one or more directional systems, such as, but not limited to, systems calculating pitch, roll and yaw (e.g., six degrees of freedom). Knowing pitch provides data indicating a front-and-back motion of the vehicle, yaw provides data indicating a rotation motion of the vehicle, and roll reflects data indicating side-to-side motions.

In various embodiments, the first and second sensor sets may also implement one or more speed monitoring systems, such as, but not limited to, systems calculating rear or front wheel speed. Speed of the vehicle may be useful for driving and control.

In various embodiments, the first and second sensor sets may also implement one or more microphone systems, such as, but not limited to, systems monitoring environmental noise, such as approaching objects, road noise, and mechanical equipment noise. For example, microphones enable a vehicle to sense what's around a corner and to warn about moving objects (such as pedestrians or vehicles) that are hidden from the autonomous car's vision systems, are concealed in a blind spot or approaching emergency vehicles that are still too far away to see.

In various embodiments, the first and second sensor sets may also implement one or more GPS systems to determine location. AVs may use GPS to geolocate with numerical coordinates (e.g., latitude, longitude) representing their physical locations in space. They can also navigate by combining real-time GPS coordinates with other digital map data.

In various embodiments, the first and second sensor sets may also implement one or more sensor power controllers to monitor and control power provided to the various sensors (e.g., cameras, lidar, radar, etc.), computing modules and driving controller modules (e.g., steering, braking, acceleration, etc.). The sensor power controllers measure and manage the power requirements of each component and the overall grouping of various components to control power distribution.

The above described sensors and driving controller modules reflect exemplary sensor and control elements. However, the technology described herein is not limited thereto. Any current or future sensors or driving controller modules may be substituted without departing from the scope herein.

In some embodiments, the technology described herein implements continuous communication 410 of collected data from the backup AVS second sensor set 408 to the primary AVS 402, via a communications link. Alternatively, or in addition, the data collected from first sensor set 404 is continuously communicated 410 to the backup AVS 406. If the communications link between the primary AVS 402 and the backup AVS 406 fails, for example, due to a switch failure, power failure, computer failure, or other AVS malfunction, the second sensor set 408 provides sufficient data for the backup AVS 406 to substantially perform AVS operations. As shown, dedicated high speed communication channels, such as Ethernet channels, may be configured to transfer collected data from high data rate devices, such as lidar and radar that are able to sample millions of data points per second. In some embodiments, a CAN-FD (Controller Area Network Flexible Data-Rate) connection may be implemented. CAN-FD is a data-communication protocol typically used for broadcasting sensor data and control information on 2 wire interconnections between different parts of electronic instrumentation and control systems. This protocol is commonly used in modern high performance vehicles. However, any known or future high speed data transmission channels, wired, fiber optic or wireless, may be substituted without departing from the scope of the technology described herein.

Figure 5:
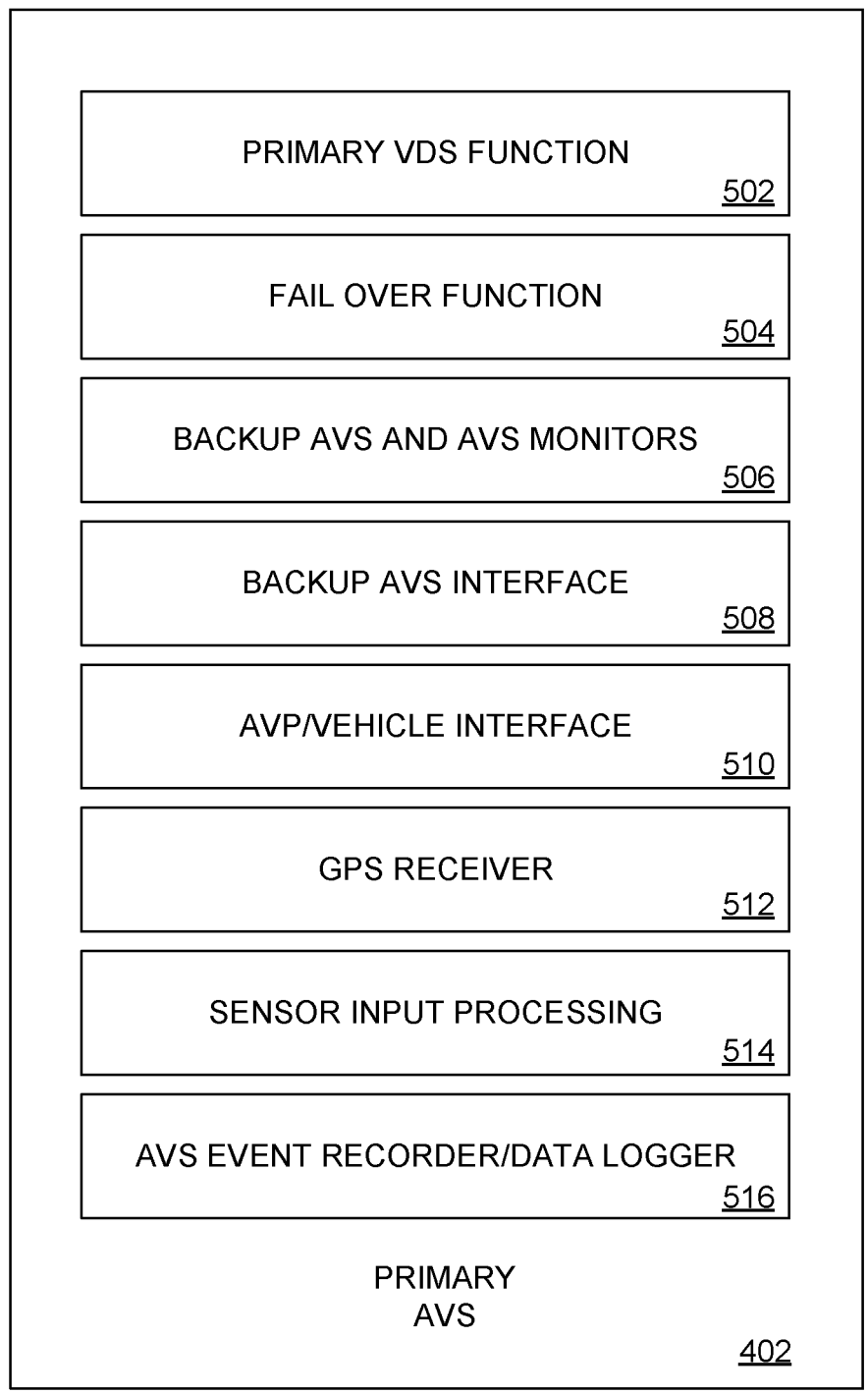
FIG. 5 illustrates a block diagram for a primary AVS, in accordance with aspects of the disclosure.

FIG. 5 illustrates a block diagram for a primary AVS, in accordance with aspects of the disclosure. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

In some embodiments, the technology described herein implements an asymmetrical AVS computing architecture. The asymmetrical AVS computing architecture may implement an AVS that operates a vehicle in one or more autonomous modes and a communicatively coupled backup AVS. Each of these systems will be described in greater detail in FIGS. 5 and 6 that follow.

As shown in FIG. 5, primary AVS 402 (from FIG. 4), may implement a plurality of functional components to autonomously control a vehicle from the AVS, while also monitoring functionality of the backup AVS 406. While specific functional components are illustrated and described, more or less components may be implemented without departing from the scope of the technology described herein. In addition, future known functional components may be substituted without departing from the scope.

The primary AVS 402 includes Primary Virtual Driver System (VDS) functions 502 that are configured to operate the vehicle autonomously using a combination of sensors. The terms Virtual Driver System (VDS), Automated Driving System (ADS) and Self-Driver System (SDS) have been used interchangeably in the past. A self-driving vehicle, also known as an autonomous vehicle (AV) is a vehicle incorporating vehicular automation that is capable of sensing its environment and moving with little or no human input. As previously described, self-driving vehicles combine a variety of sensors to perceive their surroundings, such as cameras, radar, lidar, sonar, GPS, odometry and inertial measurement units. Advanced control systems interpret sensory information to identify appropriate navigation paths, as well as obstacles and relevant signage.

The primary AVS 402 also includes a fail over function 504 that implements a multi-level switching process to one or more backup components. The multiple levels will be described in greater detail in association with FIG. 7. Fail over function 504 implies one or more levels of autonomous control with satisfactory performance under significant uncertainties in the environment, and the ability to compensate for system failures without external intervention.

The primary AVS 402 also includes Primary AVS and Backup AVS monitors 506 that implement a continuous monitoring of the first sensor set and the second sensor set. While sensors and AVS control may vary in an asymmetrical AVS, each sensor should be continuously monitored as they may be needed in any failure scenario. In some embodiments, the first sensor set and the second sensor set, collectively continuously provide data points to the AVS for full autonomous vehicle control. In a non-limiting example, if communications between the AVS and backup AVS are terminated or interrupted, the backup AVS will take over vehicle control (fail over function 504) using only the second sensor set devices and their respective data points.

The primary AVS 402 also includes a Backup AVS Interface 508 that implements a shared boundary across which an AVS computer system and the backup AVS exchange information. The exchange can be between software, computer hardware, peripheral devices, humans, and combinations of these. Some computer hardware devices may both send and receive data through the interface, while others such may only provide an interface to send data to a given system. In a non-limiting example, the primary AVS computer system and backup AVS computer system continuously share sensor data from both the first sensor set and the second sensor set. In another non-limiting example, the primary AVS computer system and backup AVS computer system continuously both share mapping, power and inertial sensor data.

In another non-limiting example, the primary AVS computer system and backup AVS computer system continuously share a heartbeat signal. A heartbeat signal is a periodic signal generated by hardware or software to indicate normal operation or to synchronize other parts of a computer system. The heartbeat signal is a technique implemented in mission critical systems for providing high availability and fault tolerance of AVS operations by detecting the network or systems failures for the purpose of automatic adaptation and rebalancing of the system by using the remaining redundant components to take over the load of failed components for providing constant services. Usually a heartbeat signal is sent between machines at a regular interval. However, if the endpoint does not receive a heartbeat for a time, for example, one or more heartbeat intervals, the system that should have sent the heartbeat is assumed to have failed. Heartbeat signals or messages are typically sent non-stop on a periodic or recurring basis from the originator's start-up until the originator's shutdown. When the destination identifies a lack of heartbeat messages during an anticipated arrival period, the destination may determine that the originator has failed, shutdown, or is generally no longer available.

The primary AVS 402 also includes the Autonomous Vehicle Platform (AVP)/Vehicle Interface (VI) 510 that provides an interface with the vehicle. The AVP/VI 510 implements perception and processing functions to act on the vehicle by commanding lateral or longitudinal inputs. In a non-limiting example, these functions may include using a steering mechanism and the powertrain (e.g., brake and throttle). It also allows these same functions to receive the current state of the vehicle with respect to those controls (current wheel speed, steering angle, etc.). The AVP/VI 510 allows the processing functions to command and receive data regarding other vehicle functions, such as, but not limited to, turn signals, seatbelt attachment, occupancy detection, etc.

The primary AVS 402 also includes a GPS receiver 512 that implements one or more GPS systems to determine location. In some embodiments, an antenna is mounted to the vehicle to receive satellite signals. Avs may use GPS data to geolocate with numerical coordinates (e.g., latitude, longitude) representing their physical locations in space. They can also navigate by combining real-time GPS coordinates with other digital map data. The GPS receiver 512 calculates its own four-dimensional position in space-time based on data received from multiple GPS satellites. Each satellite carries an accurate record of its position and time, and transmits that data to the receiver. The satellites carry very stable atomic clocks that are synchronized with one another and with ground clocks. Any drift from time maintained on the ground is corrected daily. In the same manner, the satellite locations are known with great precision. GPS receivers have clocks as well, but they are less stable and less precise. Since the speed of radio waves is constant and independent of the satellite speed, the time delay between when the satellite transmits a signal and the receiver receives it is proportional to the distance from the satellite to the receiver. At a minimum, four satellites must be in view of the GPS receiver for it to compute four unknown quantities (three position coordinates and the deviation of its own clock from satellite time).

The primary AVS 402 also includes Sensor Input Processor 514 that receives sensor data points from a sensor device located in the first sensor set or the second sensor set and processes the collected data points and generates an output in a form usable by the primary AVS or backup AVS to respond according to some data point(s) received from the physical environment. A non-limiting example would include the AVS including inputs for all high-resolution and long range cameras, such as, long/medium range Lidar (exclusively part of the first sensor set).

The primary AVS 402 also includes an AVS Event Recorder or Data Logger 516 that captures events formulated by processed data points by the AVS. Event recording is a process for documenting the number of times a certain behavior occurs. The AVS event recorder 516 is a continuous observer by using event recording to record events and any trends of these events. The AVS event recorder 516 may also record the time period(s) in which the event is being observed. In a non-limiting example, various data points from one or more sensors, collectively, over time, indicate a vehicle behavior or incident that may be recognized as an event.

A non-limiting example would be an autonomous vehicle encountering an unrecognized situation due to objects in the environment being miss-recognized or miss-categorized. This would likely yield to an event such as the application of a high braking command, which would be tagged as an event of interest and therefore logged on this event recorder alongside a set of sensor, perception and internal data for later analysis.

Figure 6:
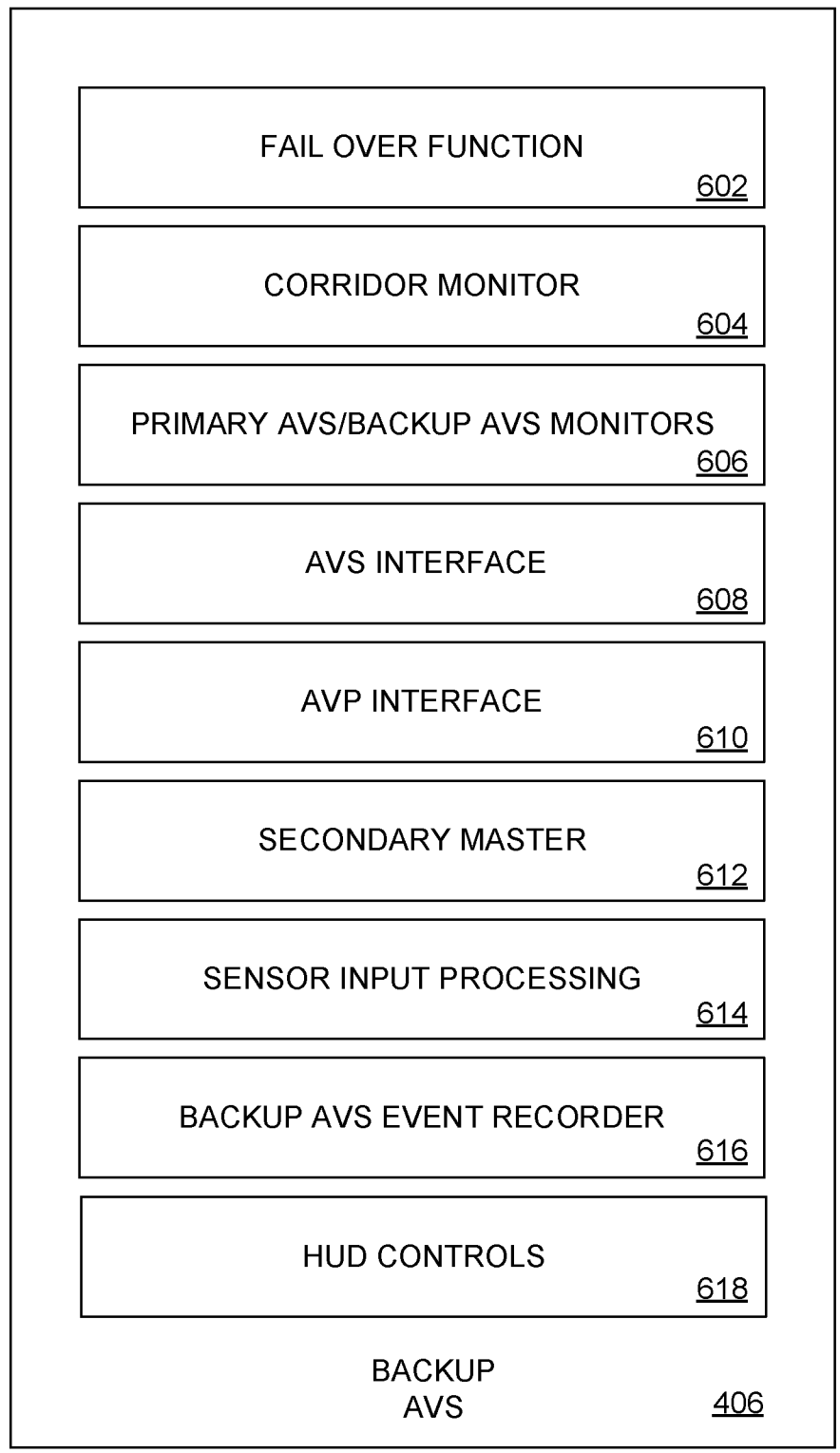
FIG. 6 illustrates a block diagram for a backup AVS, in accordance with aspects of the disclosure.

FIG. 6 illustrates a block diagram for a backup AVS, in accordance with aspects of the disclosure. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 6, as will be understood by a person of ordinary skill in the art.

In some embodiments, the technology described herein implements an asymmetrical AVS computing architecture. The asymmetrical AVS computing architecture may implement an AVS that operates a vehicle in one or more autonomous modes and a communicatively coupled backup AVS.

As shown in FIG. 6, backup AVS 406 (from FIG. 4), may implement a plurality of functional components to autonomously control one or more components of a vehicle from the backup AVS 406, while also monitoring functionality of the primary AVS 402. While specific functional components are illustrated and described, more or less components may be implemented without departing from the scope of the technology described herein. In addition, future known functional components may be substituted without departing from the scope.

The backup AVS 406 includes a Fail Over Function 602 that implements a multi-level switching process to one or more backup components. The multiple levels will be described in greater detail in association with FIG. 7. Fail over function 602 implies one or more levels of autonomous control with satisfactory performance under significant uncertainties in the environment, and the ability to compensate for system failures without external intervention.

The backup AVS 406 also includes a Corridor Monitor 604 that implements continuous observation of vehicle travel pathways for vehicle surroundings. Travel pathways may be the terms "street," "lane" and "intersection" with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

The backup AVS 406 also includes AVS and Backup AVS Monitors 606 that implement a continuous monitoring of the first sensor set and the second sensor set. While sensors and AVS control may vary in an asymmetrical AVS, each sensor should be continuously monitored as they may be needed in any failure scenario. In some embodiments, the first sensor set and the second sensor set, collectively continuously provide data points to the AVS for full autonomous vehicle control. In a non-limiting example, if communications between the primary AVS 402 and backup AVS 406 are terminated, the backup AVS 406 will take over vehicle control (fail over function) using only the second sensor set devices and their respective data points.

The backup AVS 406 also includes an AVS interface 608 that implements a shared boundary across which an AVS computer system and the backup AVS exchange information. The exchange can be between software, computer hardware, peripheral devices, humans, and combinations of these. Some computer hardware devices may both send and receive data through the interface, while others such may only provide an interface to send data to a given system. In a non-limiting example, the primary AVS 402 and backup AVS 406 continuously share sensor data from both the first sensor set and the second sensor set. In another non-limiting example, the primary AVS 402 and backup AVS 406 continuously both share mapping, power and inertial sensor data. In another non-limiting example, as previously described, the primary AVS 402 and backup AVS 406 continuously share a heartbeat signal.

The backup AVS 406 also includes an Autonomous Vehicle Platform (AVP) 610 that implements perception and processing functions to act on the vehicle by commanding lateral or longitudinal inputs. In a non-limiting example, these functions may include using a steering mechanism and the powertrain (e.g., brake and throttle). It also allows these same functions to receive the current state of the vehicle with respect to those controls (current wheel speed, steering angle, etc.).

The backup AVS 406 also includes a Secondary Master that implements a redundant time synchronization and distribution mechanism by using a second time server. The primary AVS 402 implements a similar function which, in case of malfunction, is therefore replaced by the complementary version. Time synchronization and distribution allows the components of a complex autonomous vehicle system to share a common time reference allowing the data to be temporally correlated between different sensors or processing functions.

The backup AVS 406 also includes a sensor input processor 614 that receives sensor data points from a sensor device located in the first sensor set and the second sensor set and processes the collected data points and generates an output in a form usable by the AVS or backup AVS to respond according to some data point(s) received from the physical environment. A non-limiting example would be a second sensor set that might exclusively include short range Lidar and Radars, but no cameras.

The backup AVS 406 also includes a Backup AVS event recorder or Data Logger 616 that captures events formulated by processed data points of the backup AVS. Event recording is a process for documenting the number of times a certain behavior occurs. The backup AVS event recorder 616 is a continuous observer by using event recording to record events and any trends of these events. The backup AVS event recorder 616 may also record the time period(s) in which the event is being observed. In a non-limiting example, various data points from one or more sensors, collectively, over time, indicate a vehicle behavior or incident that may be recognized as an event. A non-limiting example would be a short range lidar returning the data that a certain object/actor was within a defined distance buffer from the vehicle (e.g., <1.0 m when traveling at 15 mph), this would trigger an event (e.g., "close call") and would then be recorded.

The backup AVS 406 also includes a Head(s) Up Display (HUD) 618 that may be any transparent display that presents data without requiring vehicle drivers to look away from their usual viewpoints. A HUD also has the advantage that the driver's eyes do not need to refocus to view the outside after looking at the optically nearer instruments.

Figure 7:
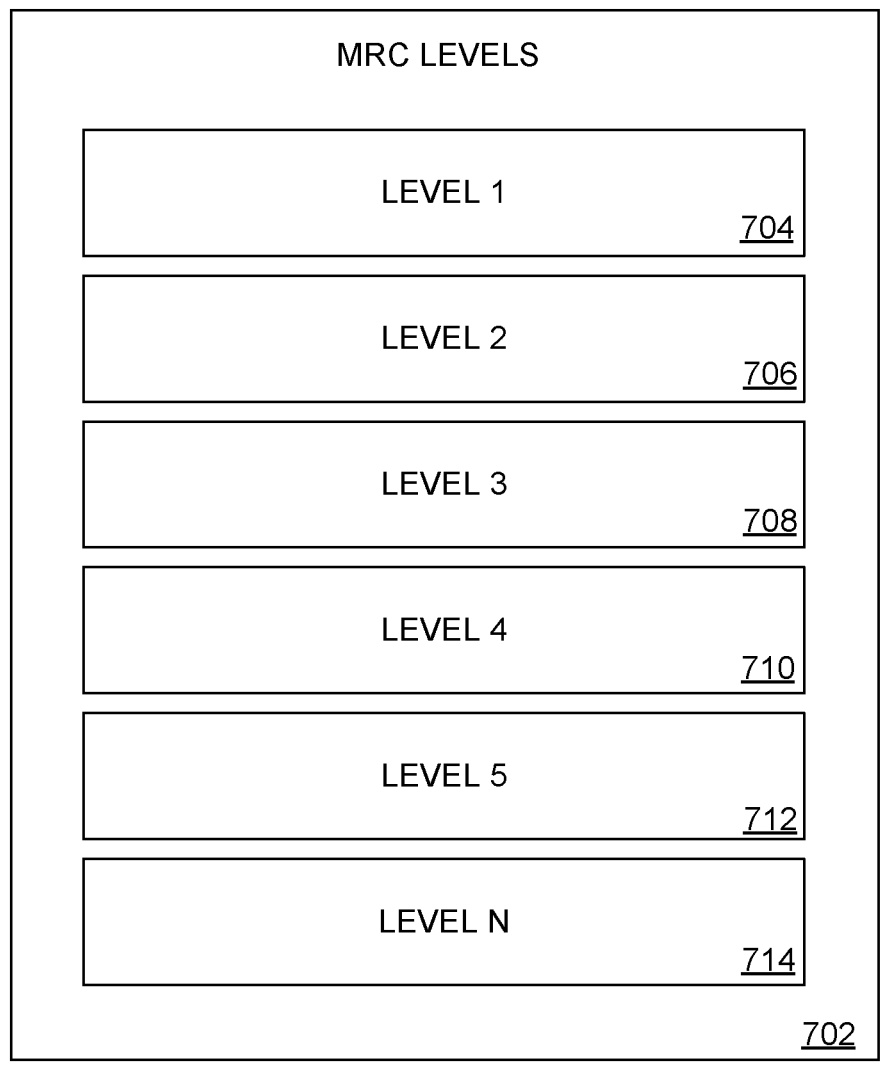
FIG. 7 illustrates a block diagram for an AVS, in accordance with aspects of the disclosure.

FIG. 7 illustrates a block diagram for an AVS, in accordance with aspects of the disclosure.

The backup AVS (e.g., backup AVS 406 of FIG. 4) is implemented on the vehicle to serve as a failover system for one or more of the primary AVS components or processes (e.g., sensor in the primary set, software process and functions, steering, braking, etc.). In this way, during AVS failures, the backup AVS 406 can handle a subset of vehicle operations in various component configuration levels based on a desired response level (e.g., pull over). A Minimal Risk Condition (MRC) is a condition to which an Automated Driving System (ADS) (or an SDS) may bring a vehicle to after performing an appropriate response in order to reduce the risk associated with the driving task when certain conditions arise. MRCs would be tiered (leveled) depending on the severity of the associated malfunction being detected and responded to.

In non-limiting failure examples, for minor AVS failures (e.g., a single sensor failure), a similar sensor in the backup AVS 406 may support the AVS. However, for a total loss of connectivity between the primary AVS 402 and the backup AVS 406, the backup AVS 406 may be responsible for driving the car for some period of time. The mission therefore will dynamically drive the selection and activation of specific backup components needed to complete the mission. For example, for a loss of communications between the primary AVS 402 and the backup AVS 406, one mission for the backup AVS 406 will drive and navigate the vehicle to a stopped state (e.g., pulled off of the roadway). Therefore, to complete this mission for a MRC level, the backup AVS 406 may need, at a minimum, electrical power, computing power, braking control components, steering control components, engine or motor control components, object detection components (e.g., lidar, radar, cameras, etc.) and navigation components (e.g., Global Positioning System (GPS) and mapping functionality).

A failure within the asymmetric architecture 400 will initiate one or more specific MRC level missions or vehicle control objectives that may be completed successfully. These MRC levels 702 (1-N), lowest criticality to highest criticality, are described in greater detail below. While described for specific levels below, the technology described herein is not limited thereto. For example, an asymmetric AVS architecture may implement more or less MRC levels, have sub-levels, have varying missions or delineate a different criticality of the levels. One skilled in the art will appreciate that other multilevel approaches may be contemplated within the scope of the technology described herein.

In one embodiment, Level 1 (704), the autonomous vehicle incurs a minimum non-critical issue, such as a sensor error or loss of sensor signal. The MRC may continue driving as before the issue with only monitoring of the issue. Alternatively, or in addition to, the asymmetrical AVS will substitute one sensor in the first sensor set and the second sensor set with a complimentary or supportive sensor. For example, a camera mounted on a rear of the vehicle that shows as malfunctioning may have data from other proximate sensors (e.g., cameras, lidar or radar) used to provide the same or similar data.

In one embodiment, Level 2 (706), the autonomous vehicle incurs a non-critical issue, such as loss of one, but not all braking or steering controllers (i.e., assumes that there is at least a primary and backup braking and steering system). In one non-limiting example, data points from a primary and secondary braking controller, or steering controller, may show a discrepancy in data or synchronization. In this case, the MRC may continue driving as before the issue with only monitoring or wait for clearing of the issue (e.g., by a maintenance or repair process). Alternatively, or in addition to, the asymmetrical AVS will substitute one failed system with its backup counterpart. For example, a primary braking system may be functionally replaced by a backup braking system. Alternatively, or in addition to, the asymmetrical AVS will pull-over the vehicle if the specific failure exceeds a MRC threshold.

In some embodiments, a first MRC level (e.g., MRC Level 2) may be escalated to a higher second MRC Level (e.g., MRC level 3). For example, the MRC Level 2 is triggered based on a specific fault, such as data issue that is expected to be a transitory. However, if after a set period of time, this condition still persists or the system has not taken the appropriate MRC Level 2 actions, the MRC Level would be raised to a higher level. This may occur at any level. Alternatively, the MRC level may be lowered if appropriate actions have been taken to reduce a level of criticality.

In one embodiment, Level 3 (708), the autonomous vehicle incurs a critical sensor malfunction or a combination of sensor malfunctions, such as, but not limited to, near distance sensors (e.g., cameras or lidar) that may provide obstacle detection near the vehicle and that may be approached quickly at speed. Alternatively, or in addition to, the asymmetrical AVS forward cameras or long range sensors may malfunction making continued navigation of the vehicle difficult or impossible. The MRC may continue driving for a short distance before navigating the vehicle to a pull-over.

In one embodiment, Level 4 (710), the autonomous vehicle incurs a critical issue, such as loss of a communication signal between the primary AVS 402 and the backup AVS 406. The MRC may continue driving until a stopping point is located and a pullover is executed by the backup AVS 406. For example, the backup AVS 406 may provide essential front facing sensor data points until the vehicle is pulled-over, while resources may not be allocated for rear-facing sensor data. Alternatively, or in addition to, the asymmetrical AVS 400 may require an immediate pull-over or stopping maneuver. At this level, the asymmetrical AVS 400 may provide emergency limited low-level power to one or more of the sensor systems, for some period of time (e.g., 30-60 seconds).

In one embodiment, Level 5 (712), the autonomous vehicle incurs a maximum critical issue, such as a loss of AVS and one or more critical functions of the backup AVS. The MRC may require a human driver to take over driving control of the vehicle with continued monitoring of the critical issues. In one embodiment, a button may be selectable by a human rider in the vehicle to disengage the primary AVS 402 and backup AVS 406 for non-autonomous driving.

In some embodiments, depending on which MRC level is considered, the mission can be executed solely by the primary AVS 402, by either of the primary AVS 402 or backup AVS 406, or solely by the backup AVS 406.

Figure 8:
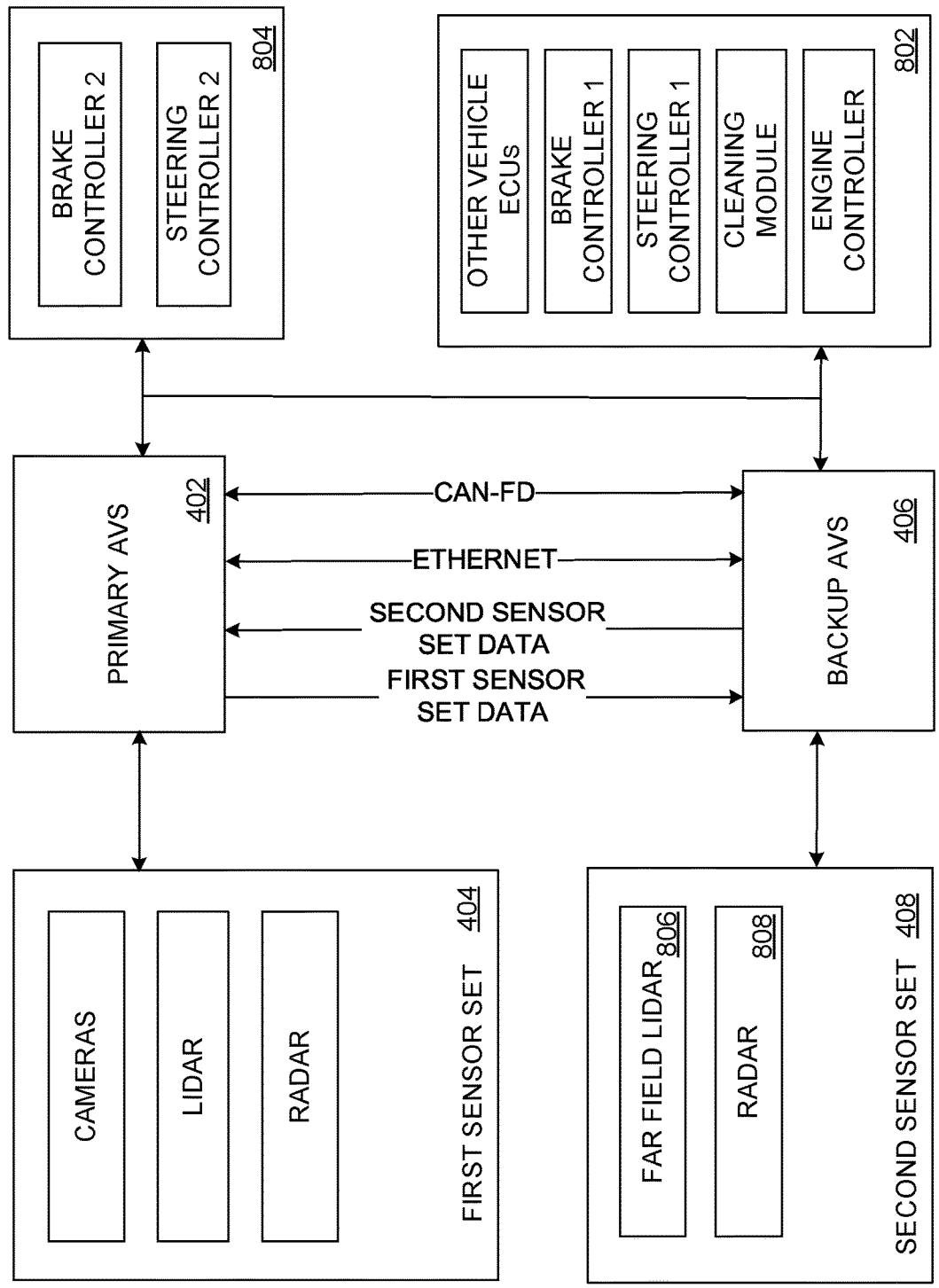
FIG. 8 illustrates a block diagram for an asymmetrical AVS, in accordance with aspects of the disclosure.

FIG. 8 illustrates a block diagram for an AVS, in accordance with aspects of the disclosure. As will be shown in FIGS. 8-11, the backup AVS 406 will implement a reduced subset of AVS functionality, with smaller subsets of sensors activated depending on a current MRC level. While not shown, any of the first sensor sets illustrated in FIGS. 8-11 may also include additional sensor components, such as, but not limited to directional sensors (e.g., pitch, yaw and roll), GPS, speed sensors, power controllers, as previously described. In addition, while an exemplary embodiment activates a subset of backup AVS sensors or controllers, a subset may also comprise a combination of selected components (e.g., sensors, controllers, computing, etc.) collectively from the primary AVS 402 and backup AVS 406 systems.

At a high level, asymmetric AVS architecture 800 may implement a first sensor set 404 and second sensor set 408. In addition, on a controller side, the asymmetric architecture 800 may implement controllers 802 by the backup AVS and controllers 804 by the AVS. As not every AVS function may be necessary in various MARC level scenarios, an exact match set of sensors or controllers may also not be required. Therefore, the overall AVS achieves reduced costs, reduced power requirements, reduced computing requirements, and increases speed (e.g., reduced data points and subsequent processing thereof) and efficiency of operations (e.g., limit responses to only needed functionality).

In some embodiments, at an MRC Level 1 (704) or MRC Level 2 (706), the autonomous vehicle may incur one or more non-critical issues. In this case, the AV may continue driving as before the issue with only monitoring or wait for clearing of the issue (e.g., by a maintenance or repair process). Alternatively, or in addition to, the asymmetrical AVS will substitute one failed system with its backup counterpart. For example, a primary braking system "Brake Controller 1" within the backup controllers 802 may be functionally replaced by a secondary braking system "Brake Controller 2" located in the AVS controllers 804. Alternatively, or in addition to, the asymmetrical AVS will pull-over the vehicle if the specific failure exceeds a MRC threshold.

In this Level 1 or Level 2 scenario, the asymmetry of the architecture may be shown by backup AVS 406 processing a smaller subset of all sensors, such as, but not limited to, Far Field Lidar 806 and Radar 808. In these low level, MRC scenarios, only a small subset of potentially useful distant information may be necessary in a non-critical failure situation. Considerable computing power may be saved by not processing camera data points or additional lidar formats, such as, but not limited to, near field lidar, short range lidar, long range lidar, etc.

Figure 9:
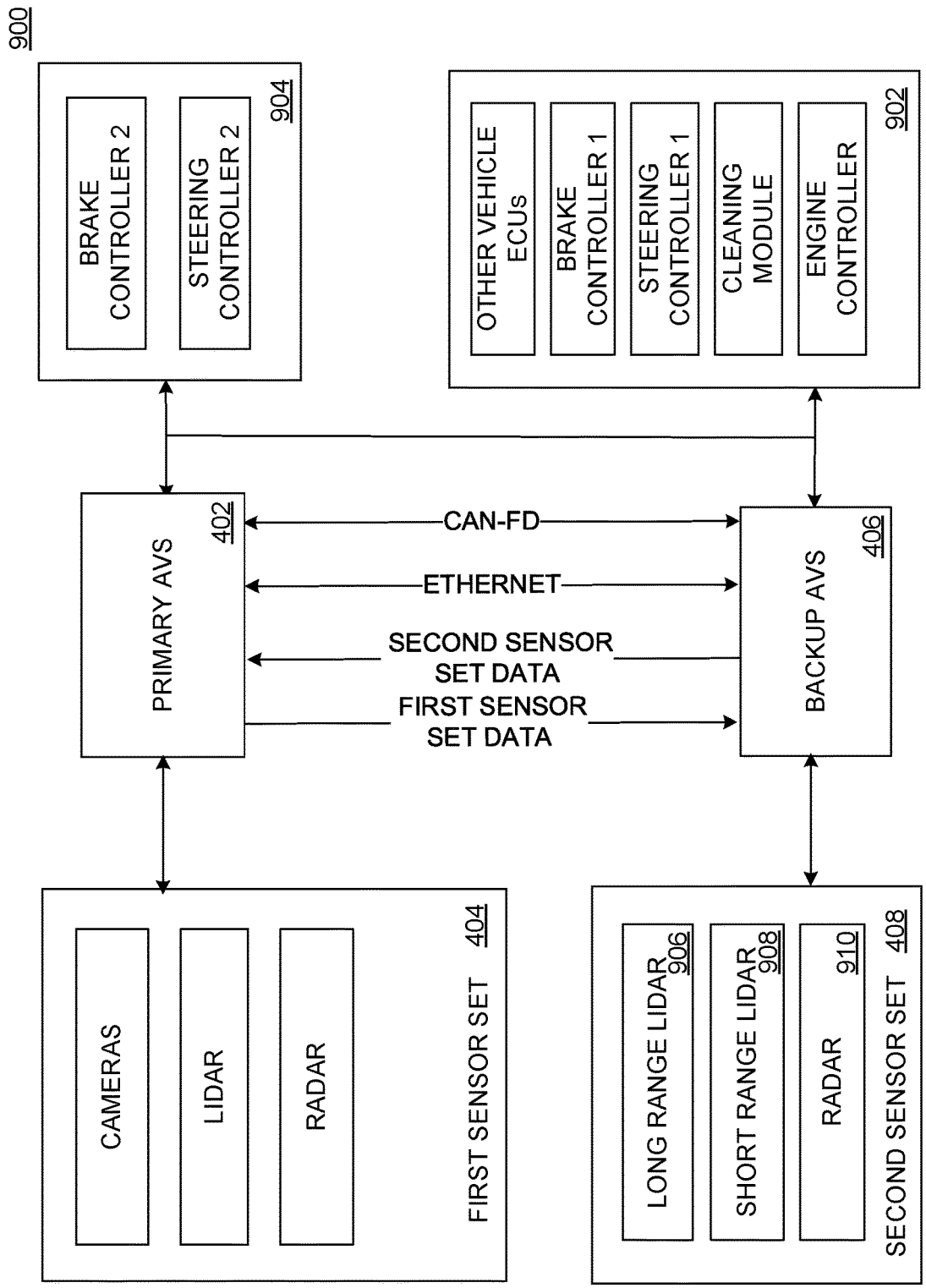
FIG. 9 illustrates a block diagram for an asymmetrical AVS, in accordance with aspects of the disclosure.

FIG. 9 illustrates a block diagram for an AVS, in accordance with aspects of the disclosure. At a high level, asymmetric AVS architecture 900 may implement a first sensor set 404 and second sensor set 408. In addition, on a controller side, the asymmetric architecture may implement controllers 902 by the backup AVS 406 and controllers 904 by the primary AVS 402. As not every AVS function may be necessary in various MRC level scenarios, an exact match set of sensors or controllers may also not be required. Therefore, the overall AVS architecture 900 achieves reduced costs, reduced power requirements, reduced computing requirements, and increases speed (e.g., reduced data points and subsequent processing thereof) and efficiency of operations (e.g., limit responses to only needed functionality).

In some embodiments, at an MRC Level 3 (708), the autonomous vehicle may incur one or more critical issues. In a non-limiting example, the autonomous vehicle may incur a critical sensor malfunction or combination of sensor malfunctions, such as, but not limited to, near distance sensors (e.g., cameras or lidar) that may provide obstacle detection near the vehicle and that may be approached quickly at speed. Alternatively, or in addition to, the asymmetrical AVS 900 forward cameras or long range sensors may malfunction making continued navigation of the vehicle difficult or impossible. The AVS may continue driving for a short distance before navigating the vehicle to a pull-over.

In this Level 3 scenario, the asymmetry of the architecture may be shown by backup AVS 406 processing a smaller subset of all sensors, such as, but not limited to, Long Range Lidar 906, Short Range Lidar 908 and Radar 910. At this level, MRC scenarios may need data points near and far to immediately locate near obstacles, but also to anticipate more distance obstacles as the vehicle attempts to navigate to a location to stop. Considerable computing power may be saved by not processing camera data points or additional lidar formats, such as, but not limited to, near field lidar, etc.

Figure 10:
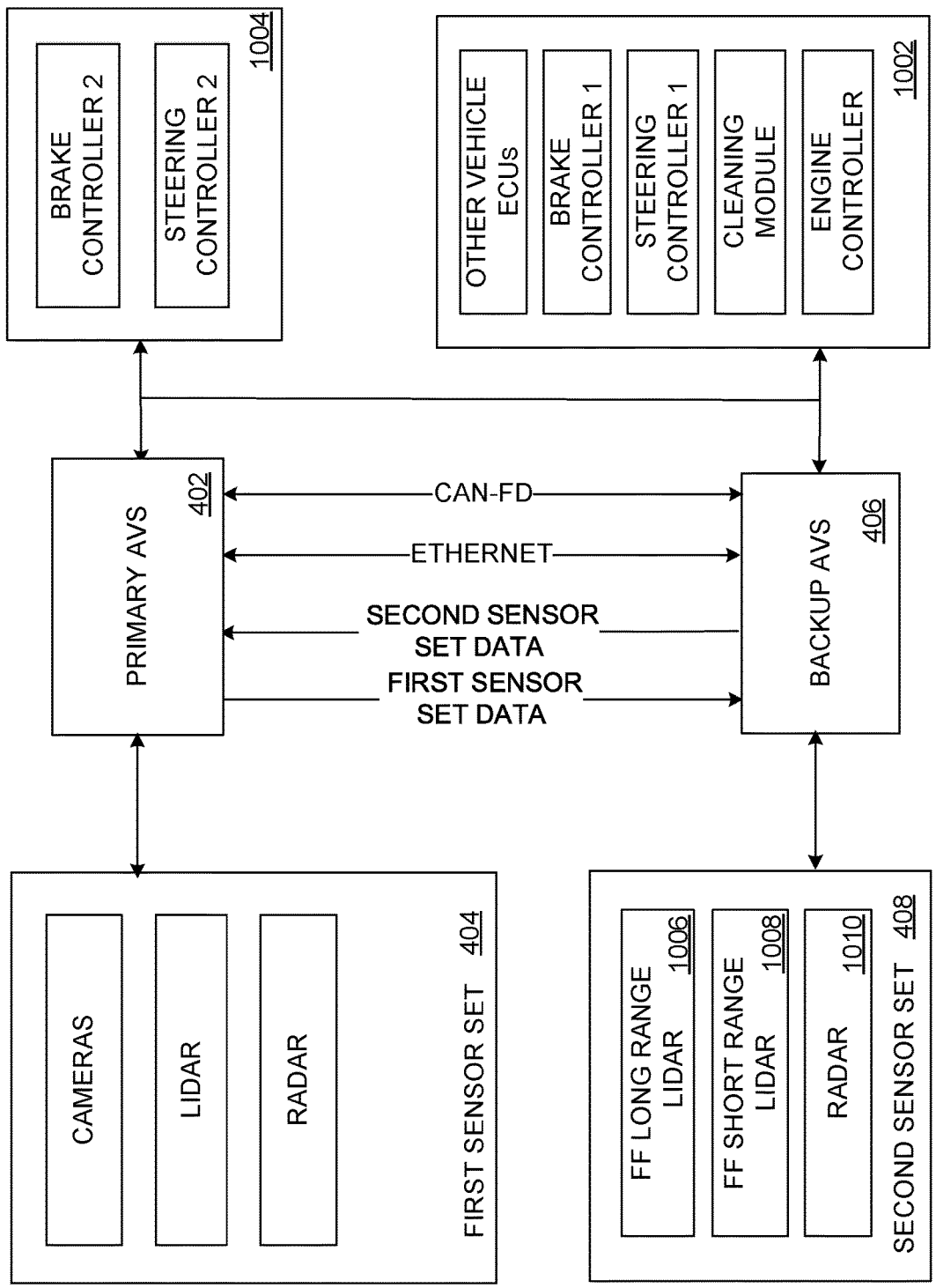
FIG. 10 illustrates a block diagram for an asymmetrical AVS, in accordance with aspects of the disclosure.

FIG. 10 illustrates a block diagram for an AVS, in accordance with aspects of the disclosure. At a high level, asymmetric AVS architecture 1000 may implement a first sensor set 404 and second sensor set 408. In addition, on a controller side, the asymmetric architecture 1000 may implement controllers 1002 by the backup AVS 406 and controllers 1004 by the primary AVS 402. As not every AVS function may be necessary in various MRC level scenarios, an exact match set of sensors or controllers may also not be required. Therefore, the overall AVS architecture 1000 achieves reduced costs, reduced power requirements, reduced computing requirements, and increases speed (e.g., reduced data points and subsequent processing thereof) and efficiency of operations (e.g., limit responses to only needed functionality).

In some embodiments, at an MRC Level 4 (710), the autonomous vehicle may incur one or more critical issues, such as a loss of a communication signal between the primary AVS 402 and the backup AVS 406. However, at this level, the backup AVS 406 may be required to handle all autonomous driving functionality and therefore may need to optimize sensor input data and optimize computing resources. The AV may continue driving until a stopping point is located and a pullover is executed by the backup AVS 406. In a non-limiting example, the backup AVS 406 may provide essential "front facing" sensor data points using Front Facing (FF) Near Field Lidar 1006, Front Facing Far Field Lidar 1008 and Radar 1010 until the vehicle is pulled-over, while resources may not be allocated for rear-facing sensor data. Alternatively, or in addition to, the asymmetrical AVS may require an immediate pull-over or stopping maneuver. At this level, the asymmetrical AVS may provide emergency limited low-level power to one or more of the sensor systems, for some period of time (e.g., 30-60 seconds).

Figure 11:
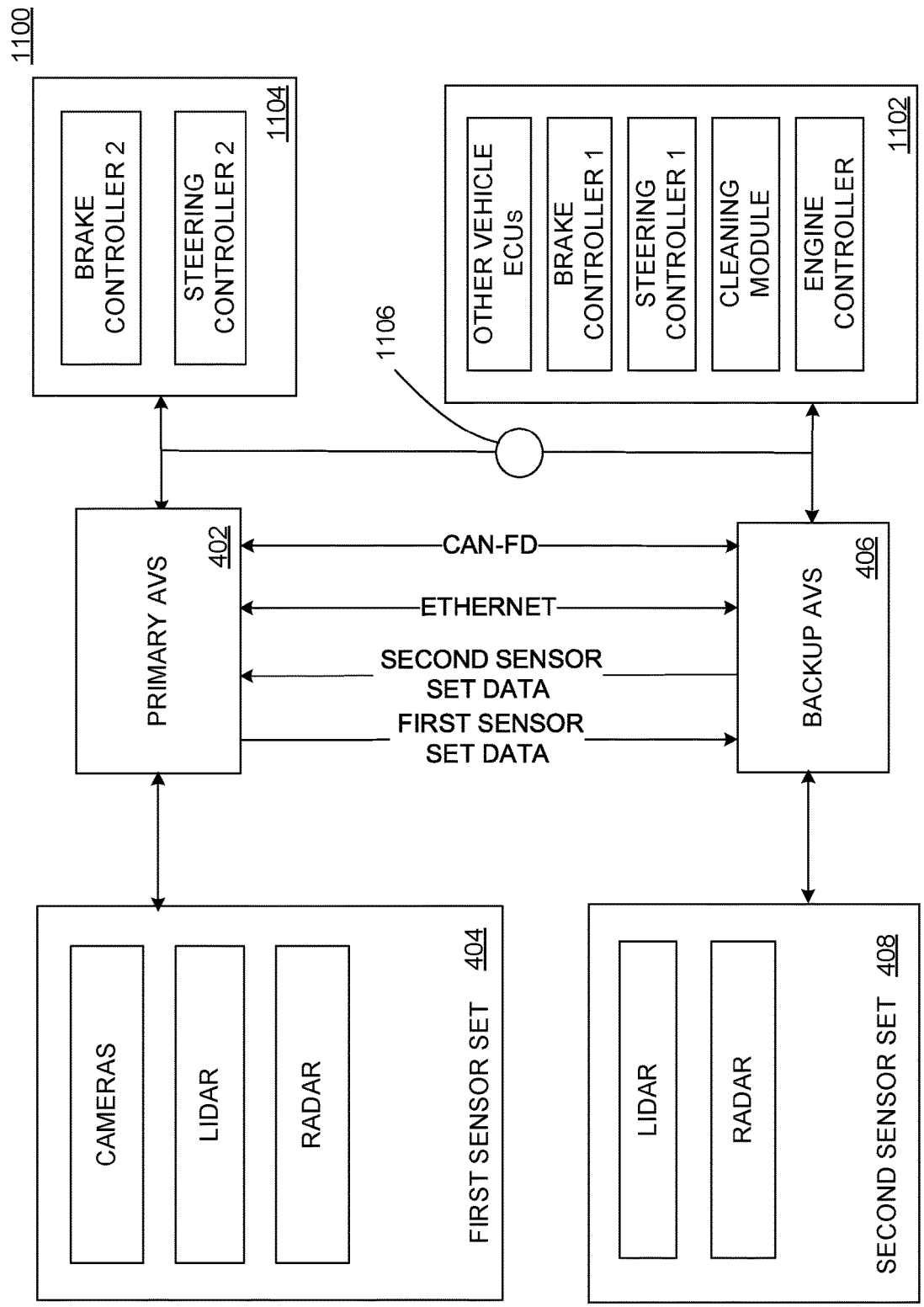
FIG. 11 illustrates a block diagram for an asymmetrical AVS, in accordance with aspects of the disclosure.

FIG. 11 illustrates a block diagram for an AVS, in accordance with aspects of the disclosure. At a high level, asymmetric AVS architecture 1100 may implement a first sensor set 404 and second sensor set 408. In addition, on a controller side, the asymmetric architecture 1100 may implement controllers 1102 by the backup AVS 406 and controllers 1104 by the primary AVS 402. As not every AVS function may be necessary in various MRC level scenarios, an exact match set of sensors or controllers may also not be required. Therefore, the overall AVS achieves reduced costs, reduced power requirements, reduced computing requirements, and increases speed (e.g., reduced data points and subsequent processing thereof) and efficiency of operations (e.g., limit responses to only needed functionality).

In some embodiments, at an MRC Level 5 (712), the autonomous vehicle may incur a maximum critical issue, such as a loss of the primary AVS 402 and one or more critical functions of the backup AVS 406. The AV may require a human driver to take over driving control of the vehicle with continued monitoring of the critical issues. In one embodiment, a button 1106 may be selectable by a human rider in the vehicle passenger area (e.g., dashboard) to disengage/engage the primary AVS 402 and backup AVS 406 for selective non-autonomous driving. In one example embodiment, the button acts as a disconnect switch to decouple the control outputs from the primary AVS 402 and backup AVS 406 to the brakes, steering and powertrain controllers.

Figure 12:
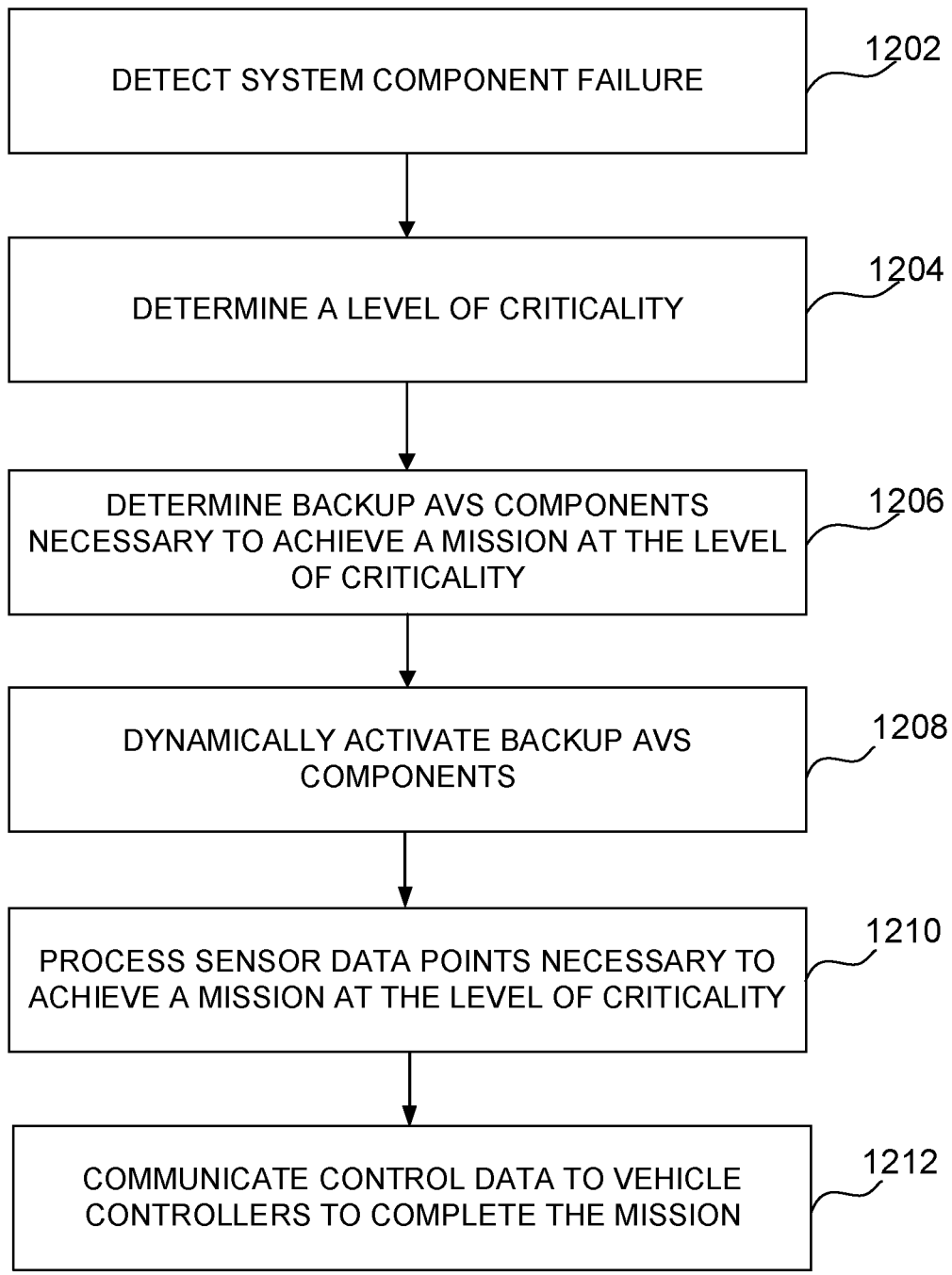
FIG. 12 illustrates a flow diagram for an asymmetrical AVS, in accordance with aspects of the disclosure.

FIG. 12 illustrates a flow diagram for an asymmetrical AVS, in accordance with aspects of the disclosure. At 1202, the asymmetrical AVS detects that a failure of one or more AVS components has occurred. For example, the system may determine that a single sensor (e.g., camera) is failing to source image data to the primary AVS or backup AVS. In another example, the primary AVS is no longer in communication with the backup AVS.

At 1204, the asymmetrical AVS determines a level of criticality. For example, the system classifies at what MRC level the detected failure resides. For example, for a single sensor failure, the MRC level may be at Level 1. In another example, a total loss of communication between the AVS and backup AVS may be classified at level 4.

At 1206, the asymmetrical AVS determines which backup AVS components may be necessary to complete a mission at the classified MRC level of criticality. For example, for a MRC level 3 failure, the asymmetrical AVS determines that proximate objects need to be detected as well as distant objects. Therefore, the asymmetrical AVS determines the sensor components available on the backup AVS that may provide the needed data points.

At 1208, the asymmetrical AVS activates the backup AVS components necessary to complete a mission at the classified MRC level, where the backup AVS components comprise one or more sensors and one or more vehicle controllers. For example, for a MRC level 3 failure, the asymmetrical AVS activates near and far field lidar sensor systems and steering and braking controllers.

At 1210, the asymmetrical AVS processes the data points necessary to complete a mission at the classified MRC level and to determine an input to the one or more vehicle controllers. For example, for a MRC level 3 failure, the asymmetrical AVS processes the near and far field lidar sensor system data points within an obstacle detection or mapping system and controls steering or braking controllers accordingly. Therefore, the vehicle controllers control, based on the determined inputs, the vehicle to complete the mission at the level of criticality.

Figure 13:
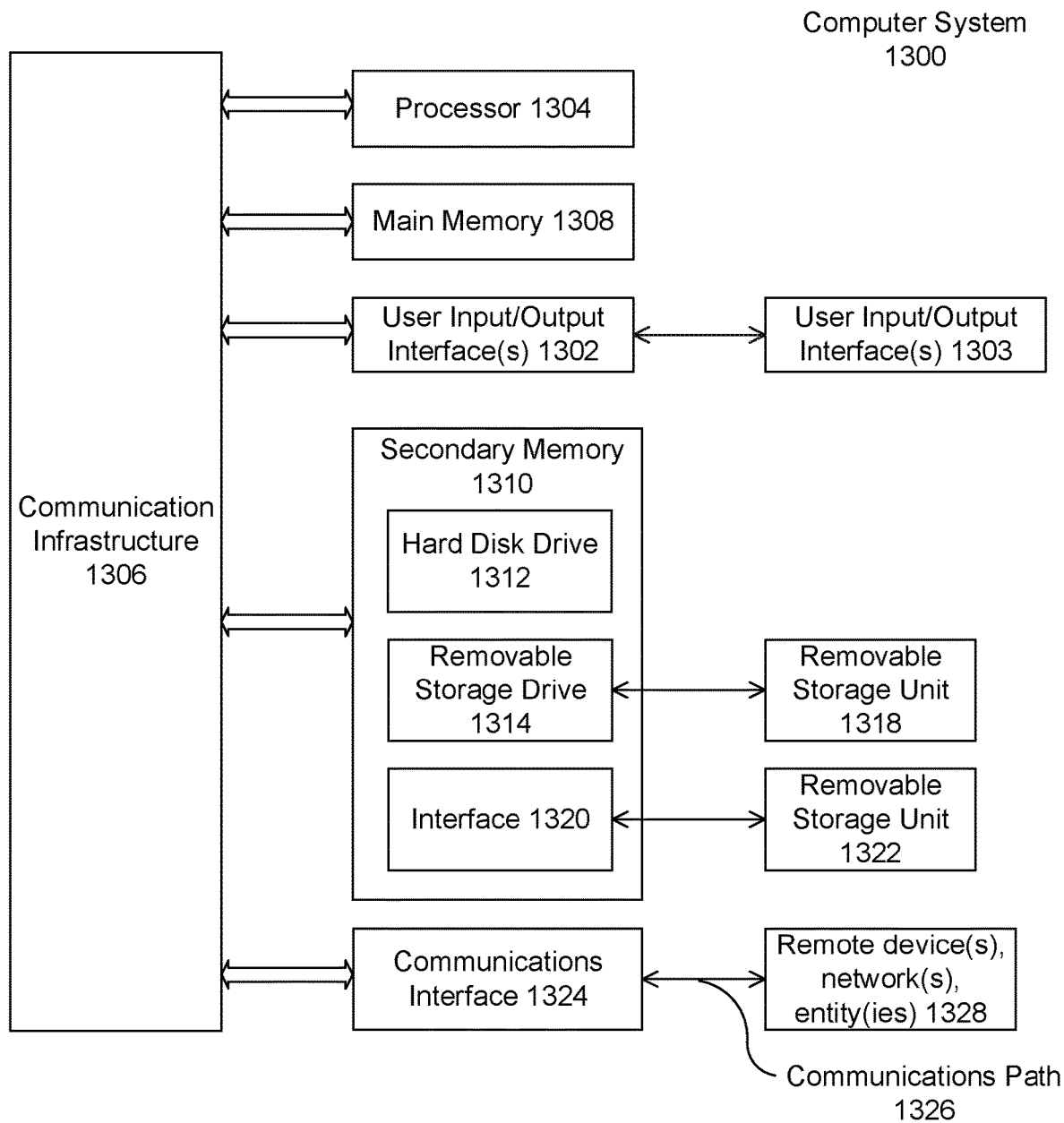
FIG. 13 is an example computer system useful for implementing various embodiments.

Various embodiments can be implemented, for example, using one or more computer systems, such as computer system 1300 shown in FIG. 13. Computer system 1300 can be any computer capable of performing the functions described herein.

Computer system 1300 includes one or more processors (also called central processing units, or CPUs), such as a processor 1304. Processor 1304 is connected to a communication infrastructure or bus 1306.

One or more processors 1304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 also includes user input/output device(s) 1303, such as monitors, keyboards, pointing devices, etc., that communicate with communication infrastructure 1306 through user input/output interface(s) 1302.

Computer system 1300 also includes a main or primary memory 1308, such as random access memory (RAM). Main memory 1308 may include one or more levels of cache. Main memory 1308 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to an exemplary embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A method, comprising:
  detecting, by an asymmetrical Autonomous Vehicle System (AVS), that a failure of one or more AVS components has occurred for a vehicle;
  determining, by the asymmetrical AVS, a level of criticality of the failure based on a severity of the failure and a minimal risk condition (MRC) for selected driving tasks of a vehicle mission;

determining, by the asymmetrical AVS, a subset of AVS backup components to complete the vehicle mission at the level of criticality;

activating, by the asymmetrical AVS, the AVS backup components necessary to complete the vehicle mission at the level of criticality, wherein the backup AVS components comprise one or more sensors and one or more vehicle controllers;

processing, by the asymmetrical AVS, data points received from the one or more sensors to determine an input to the one or more vehicle controllers; and controlling, by the asymmetrical AVS and the vehicle controllers, the vehicle to complete the mission at the level of criticality.

2. The method of claim 1, wherein the asymmetric AVS comprises a primary AVS with a first set of sensors and a backup AVS with a second set of sensors.

3. The method of claim 2, further comprising: continuously sharing data points from the first set of sensors with the backup AVS; and continuously sharing data points from the second set of sensors with the primary AVS.

4. The method of claim 2, further comprising periodically sharing a heartbeat message between the primary AVS and the backup AVS to indicate normal operation or to synchronize.

5. The method of claim 2, wherein the level of criticality comprises a loss of communications between the primary AVS and the backup AVS, and the method further comprises initiating, using the backup AVS, autonomous driving of the vehicle to complete the mission.

6. The method of claim 2, further comprising mapping the second set of sensors to the level of criticality.

7. The method of claim 2, further comprising mapping the one or more vehicle controllers to the level of criticality.

8. An asymmetrical Autonomous Vehicle System (AVS), comprising:
a memory; and
at least one processor coupled to the memory and configured to:
detect, by an asymmetrical AVS, that a failure of one or more AVS components of a vehicle has occurred;
determine, by the asymmetrical AVS, a level of criticality of the failure based on a severity of the failure and a minimal risk condition (MRC) for selected driving tasks of a vehicle mission;
determine, by the asymmetrical AVS, a subset of AVS backup components to complete the vehicle mission at the level of criticality;
activate, by the asymmetrical AVS, the AVS backup components necessary to complete the vehicle mission at the level of criticality, wherein the backup AVS components comprise one or more sensors and one or more vehicle controllers;
process, by the asymmetrical AVS, data points received from the one or more sensors to determine an input to the one or more vehicle controllers; and
control, by the asymmetrical AVS and the vehicle controllers, the vehicle to complete the mission at the level of criticality.

9. The asymmetrical AVS of claim 8, wherein the asymmetrical AVS comprises a primary AVS with a first set of sensors and a backup AVS with a second set of sensors.

10. The asymmetrical AVS of claim 9, wherein the second set of sensors comprises different sensors from the first set of sensors.

11. The asymmetrical AVS of claim 9, wherein the second set of sensors includes a different set of sensors than the first set of sensors.

12. The asymmetrical AVS of claim 9, wherein the level of criticality comprises a loss of communications between the primary AVS and the backup AVS, and further comprises initiating, using the backup AVS, autonomous driving of the vehicle to complete the mission.

13. The asymmetrical AVS of claim 9, further configured to map the second set of sensors to the level of criticality.

14. The asymmetrical AVS of claim 9, further configured to share a heartbeat message as a periodic signal between the primary AVS and the backup AVS to indicate normal operation or to synchronize.

15. The asymmetrical AVS of claim 8, wherein the one or more vehicle controllers is mapped to the level of criticality.

16. A non-transitory computer-readable medium having instructions stored thereon that, when executed by at least one computing device, cause the at least one computing device to perform operations comprising:
detecting, by an asymmetrical Autonomous Vehicle System (AVS), that a failure of one or more AVS components for a vehicle has occurred;
determining, by the asymmetrical AVS, a level of criticality of the failure based on a severity of the failure and a minimal risk condition (MRC) for selected driving tasks of a vehicle mission;
determining, by the asymmetrical AVS, AVS backup components to complete the vehicle mission at the level of criticality;
activating, by the asymmetrical AVS, a subset of the AVS backup components necessary to complete the vehicle mission at the level of criticality, wherein the backup AVS components comprise one or more sensors and one or more vehicle controllers;
processing, by the asymmetrical AVS, data points received from the one or more sensors to determine an input to the one or more vehicle controllers; and
controlling, by the asymmetrical AVS and the vehicle controllers, the vehicle to complete the mission at the level of criticality.

17. The non-transitory computer-readable medium of claim 15, wherein the asymmetrical AVS comprises a primary AVS with a first set of sensors and a backup AVS with a second set of sensors.

18. The non-transitory computer-readable medium of claim 17, wherein the level of criticality comprises a loss of communications between the primary AVS and the backup AVS, and further comprises initiating, using the backup AVS, autonomous driving of the vehicle to complete the mission.

19. The non-transitory computer-readable medium of claim 17, the operations further comprising mapping the second set of sensors to the level of criticality.

20. The non-transitory computer-readable medium of claim 16, the operations further comprising the primary AVS and backup AVS sharing a heartbeat message as a periodic signal to indicate normal operation or to synchronize.

* * * * *